United States Patent [19]

Morishita et al.

[11] 4,369,925

[45] Jan. 25, 1983

[54] ROTARY TYPE ELECTROSTATIC SPRAY PAINTING DEVICE

[75] Inventors: Teru Morishita, Shizuoka; Matuyoshi Sugiyama, Susono; Toshikazu Suzuki, Toyota, all of Japan

[73] Assignee: Toyota Jidosha Kogyo Kabushiki Kaisha, Toyota, Japan

[21] Appl. No.: 195,850

[22] Filed: Oct. 10, 1980

[30] Foreign Application Priority Data

May 21, 1980 [JP] Japan .................................. 55-66364

[51] Int. Cl.³ .......................... B05B 5/04; F16C 7/04; F16C 17/10

[52] U.S. Cl. .................................... 239/703; 239/223; 384/117

[58] Field of Search ................................ 239/700-703, 239/214, 223, 224; 308/9, 15, 121, 122, 146, 168, 170, 174, DIG. 1

[56] References Cited

U.S. PATENT DOCUMENTS

| | | | |
|---|---|---|---|
| 3,063,642 | 11/1962 | Point | 239/15 |
| 3,083,911 | 4/1963 | Griffiths | 239/15 |
| 3,121,533 | 2/1964 | Sedlacsik, Jr. | 239/15 |
| 3,128,045 | 4/1964 | Gauthier | 239/15 |
| 3,130,066 | 4/1964 | Brady | 117/93.43 |
| 3,155,539 | 11/1964 | Juvinall | 118/11 |
| 3,248,606 | 4/1966 | Fraser | 317/3 |
| 3,281,076 | 10/1966 | Burnside et al. | 237/7 |
| 3,504,851 | 4/1970 | Demeter | 239/15 |
| 3,512,502 | 5/1970 | Drum | 118/624 |
| 3,873,024 | 3/1975 | Probst | 239/15 |
| 3,985,405 | 10/1976 | Okano et al. | 308/DIG. 1 X |
| 4,148,932 | 4/1979 | Tada et al. | 239/700 X |

FOREIGN PATENT DOCUMENTS

| | | | |
|---|---|---|---|
| 2336181 | 7/1977 | France | 239/703 |
| 1213959 | 11/1970 | United Kingdom | 308/9 |

*Primary Examiner*—Andres Kashnikow

*Attorney, Agent, or Firm*—Kenyon & Kenyon

[57] ABSTRACT

A rotary type electrostatic spray painting device comprising a rotary shaft and a spray head fixed onto the front end of the rotary shaft. Paint is fed onto the cup shaped inner wall of the spray head. The rotary shaft is supported by a single thrust air bearing and a pair of tilting pad radial air bearings. The pads of the radial air bearings are electrically connected to the housing of the painting device via leads. An electrode, continuously contacting the rear end of the rotary shaft, is provided. A negative high voltage is applied to the housing of the paint device. In addition, the negative high voltage is also applied to the spray head via the electrode and the rotary shaft.

21 Claims, 11 Drawing Figures

ROTARY TYPE ELECTROSTATIC SPRAY PAINTING DEVICE

DESCRIPTION OF THE INVENTION

The present invention relates to a rotary type electrostatic spray painting device.

As an electrostatic spray painting device used for painting, for example, bodies of motor cars, a rotary type electrostatic spray painting device has been known, which comprises a rotary shaft supported by ball bearings or roller bearings within the housing of the painting device, and a cup shaped spray head fixed onto the front end of the rotary sahft. In this painting device, a negative high voltage is applied to the spray head, and paint is fed onto the inner circumferential wall of the spray head. Thus, fine paint particles charged with electrons are sprayed from the spray head and are attracted by the electrical force onto the surface of the body of a motor car, which is grounded. As a result of this, the surface of the body of a motor car is painted. In such a rotary type electrostatic spray painting device, since the paint, the amount of which is about 90 percent relative to the amount of the paint sprayed from the spray head, can be efficiently used for painting the surface to be painted, the consumption of the paint is small and, as a result, a rotary type electrostatic spray painting device is used in various industries.

In order to form a beautiful finished surface when a surface is painted by using a spray paint, it is necessary to reduce the size of the particles of paint as much as possible. In the case wherein the paint is divided into fine particles by using the centrifugal force caused by the rotation of the spray head, as in a rotary type spray painting device, the strength of the centrifugal force, that is, the rotating speed of the spray head has a great influence on the size of the particles of paint. In other words, the higher the rotating speed of the spray head becomes, the smaller the size of the particles of paint becomes. Consequently, in order to form a beautiful finished surface by using a rotary type electrostatic spray painting device, it is necessary to increase the rotating speed of the spray head as much as possible. As mentioned above, in a conventional rotary type electrostatic spray painting device, ball bearings or roller bearings are used for supporting the rotary shaft of the electrostatic spray painting device and, in addition, a lubricant, such as grease, is confined within the ball bearings or the roller bearings. However, when such bearings, which are lubricated by grease, are rotated at a high speed, the bearings instantaneously deteriorate. Therefore, in a conventional rotary type electrostatic spray painting device adopting the bearings which are lubricated by grease, the maximum rotating speed of the rotary shaft, that is, the maximum rotating speed of the spray head, is at most 20,000 r.p.m. However, in the case wherein the rotating speed of the spray head is about 20,000 r.p.m., the size of the particles of paint is relatively large and, thus, it is difficult to form a beautiful finished surface by using such a conventional rotary type electrostatic spray painting device. In the field of manufacturing motor cars, the painting process for bodies of motor cars comprises a primary spraying step, an undercoating step, and a finish painting step. However, since it is difficult to form a beautiful finished surface by using a conventional rotary type electrostatic spray painting device as mentioned above, such a conventional rotary type electrostatic spray painting device is used for carrying out the undercoating step, but cannot be used for carring out the finish painting step.

As a method of lubricating bearings, a jet lubricating system has been know, in which, by injecting the lubricating oil of a low viscosity into the region between the inner race and the outer race of the ball or roller bearing, the friction between the ball or roller and such races is greatly reduced and, at the same time, the heat caused by the friction is absorbed by the lubricating oil. In the case wherein the above-mentioned jet lubricating system is applied to a rotary type electrostatic spray painting device, it is possible to increase the rotating speed of the rotary shaft of the electrostatic spray painting device as compared with the case wherein grease lubricating bearings are used. However, since the jet lubricating system requires a complicated lubricating oil feed device having a large size, it is particularly difficult to apply such a jet lubricating system to a rotary type electrostatic spray painting device. In addition, if the lubricating oil is mixed with the paint, the external appearance of the painted surface is damaged. Therefore, if the jet lubricating system is applied to a rotary type electrostatic spray painting device, it is necessary to completely prevent the lubricating oil from leaking into the paint. However, it is practically impossible to completely prevent the lubricating oil from leaking into the paint and, thus, it is inadvisable to apply the jet lubricating system to a rotary type electrostatic spray painting device.

In addition, as a painting device capable of reducing the size of the particles of paint to a great extent, an air injection type electrostatic spray painting device has been known, in which the paint is divided into fine particles by the stream of injection air. In this air injection type electrostatic spray painting device, since the size of the particles of sprayed paint can be reduced to a great extent, as mentioned above, it is possible to form a beautiful finished surface. Consequently, in a field of manufacturing motor cars, the air injection type electrostatic spray painting device is adopted for carrying out the finish painting step for the bodies of motor cars. However, in such an air injection type electrostatic spray painting device, since the sprayed paint impinges upon the surface to be painted together with the stream of the injection air and, then, a large amount of the sprayed paint escapes, together with the stream of the injection air, without adhering to the surface to be painted, the amount of the paint used to effectively paint the surface to be painted is about 40 percent of the amount of the paint sprayed from the electrostatic spray painting device. Consequently, in the case wherein an air injection type electrostatic spray painting device is adopted, there is a problem in that the consumption of the paint is inevitably increased. In addition, in this case, a problem occurs in that the paint escaping, together with the stream of the injection air, causes air pollution within factories.

An object of the present invention is to provide a rotary type electrostatic spray painting device capable of reducing the size of the particles of paint to be sprayed and reducing the quantity of paint used.

According to the present invention, there is provided a rotary type electrostatic spray painting device comprising: a metallic housing; a metallic rotary shaft rotatably arranged to said housing and having a front end and a rear end; a cup shaped metallic spray head fixed onto the front end of said rotary shaft and having a cup shaped inner wall; a feeding means for feeding a paint onto said cup shaped inner wall; drive means cooperating with said rotary shaft for rotating said rotary shaft; a pair of radial air bearings arranged in said housing and cooperating with said rotary shaft for radially supporting said rotary shaft under a non-contacting state, each of said radial air bearing comprising a bearing frame connected to said housing, a plurality of pads, each having an inner face which extends along a circumferential outer wall of said rotary shaft and spaced from the circumferential outer wall of said rotary shaft by a slight distance, and a plurality of support pins, each being connected to said bearing frame and pivotally supporting said corresponding pad; electrically connecting means always electrically connecting said pads to said housing; non-contact type thrust bearing means arranged in said housing and cooperating with said rotary shaft for axially supporting said rotary shaft under a non-contacting state; a generator generating a negative high voltage and having an output connected to said housing, and; electrode means arranged in said housing and electrically connecting said output to said spray head.

The present invention may be more fully understood from the description of preferred embodiments of the invention set forth below, together with the accompanying drawings.

DESCRIPTION OF PREFERRED EMBODIMENTS

Figure 1:
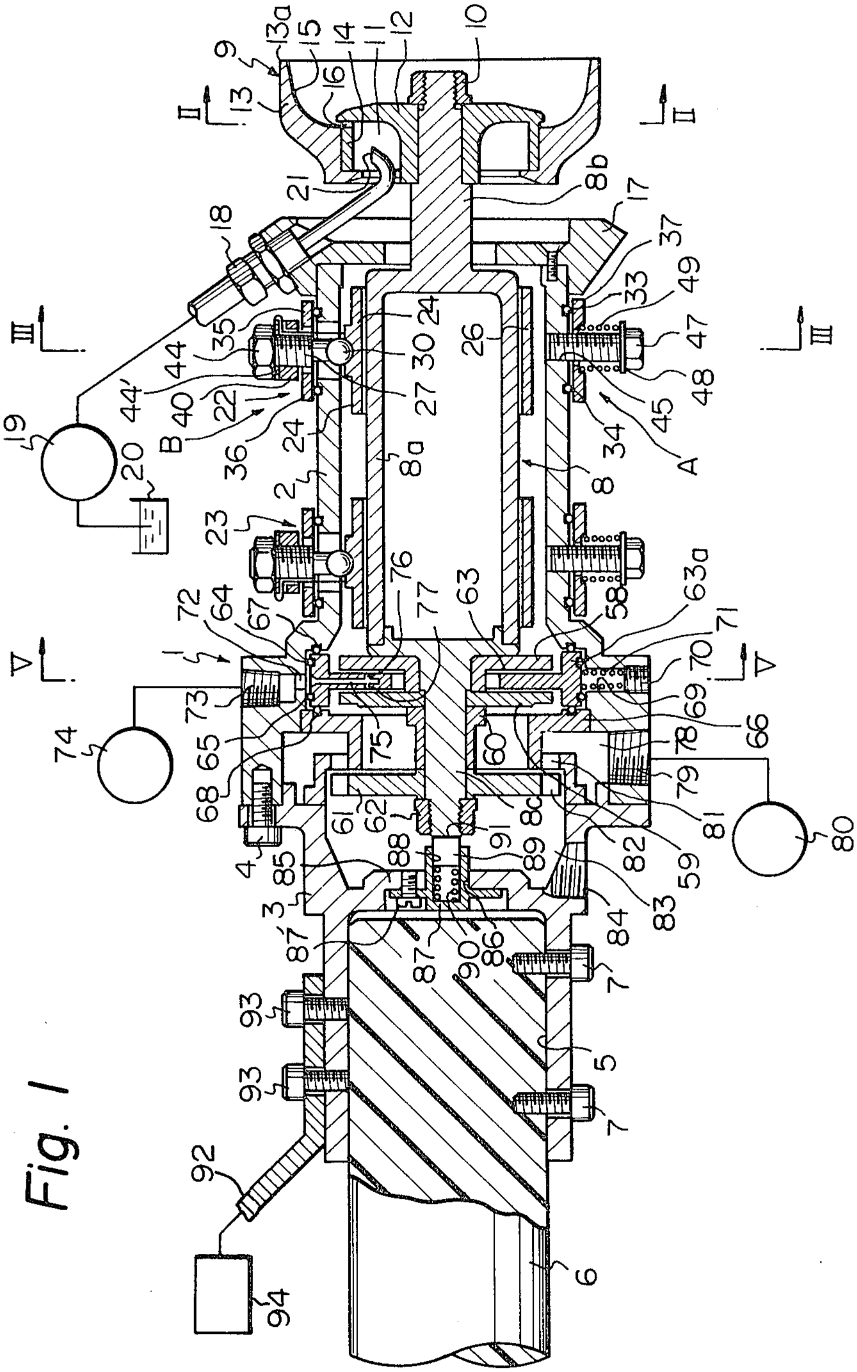
FIG. 1 is a cross-sectional side view of an embodiment of a rotary type electrostatic spray paint device according to the present invention.
Figure 2:
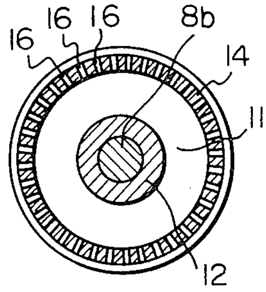
FIG. 2 is a cross-sectional view taken along the line II—II in FIG. 1.

Referring to FIG. 1, a rotary type electrostatic spray painting device, generally designated by reference numeral 1, comprises a generally hollow cylindrical front housing 2 made of metallic material, and a generally hollow cylindrical rear housing 3 made of metallic material. The front housing 2 and the rear housing 3 are firmly joined to each other by bolts 4. A support rod, made of electrically insulating material, 6 is fitted into a cylindrical hole 5 formed in the rear housing 3, and this rear housing 3 is fixed onto the support rod 6 by bolts 7. The support rod 6 is supported by a base (not shown). A rotary shaft 8 is inserted into the front housing 2. This rotary shaft 8 comprises a hollow cylindrical portion 8*a* located in the middle thereof, a shaft portion 8*b* formed in one piece on the front end of the hollow cylindrical portion 8*a*, and a shaft portion 8*c* fixed onto the rear end of the hollow cylindrical portion 8*a*. A spray head 9 made of metallic material is fixed onto the shaft portion 8*b* of the rotary shaft 8 by a nut 10. The spray head 9 comprises a spray head supporting member 12 forming therein an annular space 11, and a cup shaped spray head body 13 fixed onto the spray head supporting member 12. As illustrated in FIGS. 1 and 2, a plurality of paint outflow bores 16, each opening into the annular space 11 and smoothly connected to an inner wall 15 of the spray head body 13, is formed in an outer cylindrical portion 14 of the spray head supporting member 12. As illustrated in FIG. 1, an end plate 17 is fixed onto the front end of the front housing 2, and a paint injector 18 is mounted on the end plate 17. The paint injector 18 is connected to a paint reservoir 20 via a paint feed pump 19, and a nozzle 21 of the paint injector 18 is directed to the cylindrical inner wall of the outer cylindrical portion 14 of the spray head supporting member 12.

Figure 3:
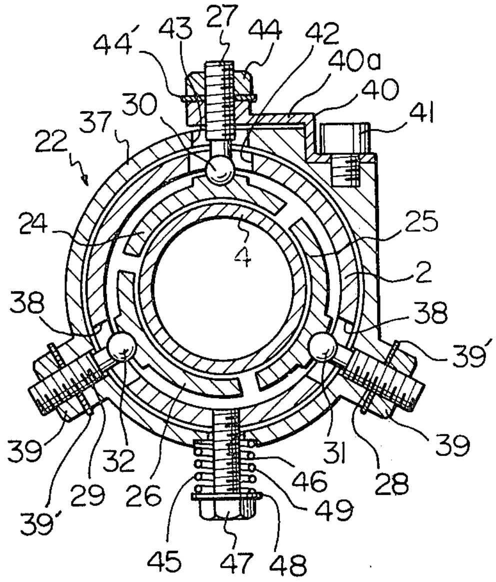
FIG. 3 is a cross-sectional view taken along the line III—III in FIG. 1.
Figure 4:
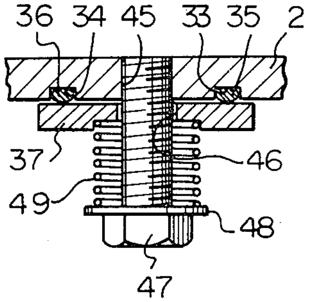
FIG. 4 is an enlarged cross-sectional side view of the portion indicated by the arrow A in FIG. 1.

A pair of non-contact type tilting pad radial air bearings 22 and 23 is arranged in the front housing 2, and the rotary shaft 8 is rotatably supported on the front housing 2 via a pair of the tilting pad radial air bearings 22 and 23. Both the tilting pad radial air bearings 22 and 23 have the same construction and, therefore, the construction of only the tilting pad radial air bearing 22 will be hereinafter described. Referring to FIGS. 1 and 3, the tilting pad radial air bearing 22 comprises three pads 24, 25, 26 spaced from the outer circumferential wall of the hollow cylindrical portion 8*a* of the rotary shaft 8 by an extremely small distance, and three support pins 27, 28, 29 supporting the pads 24, 25, 26, respectively. Spherical tips 30, 31, 32 are formed in one piece on the inner ends of the support pins 27, 28, 29, and are in engagement with spherical recesses formed on the rear faces of the pads 24, 25, 26, respectively. Consequently, the pads 24, 25, 26 can swing about the corresponding spherical tips 30, 31, 32, each functioning as a fulcrum. As illustrated in FIGS. 1 and 4, ring grooves 33 and 34 are formed on the outer circumferential wall of the front housing 2 at a position located on each side of the support pins 27, 28, 29, and a bearing support frame 37 is mounted on the front housing 2 via O rings 35 and 36 which are filtted into the ring grooves 33 and 34, respectively. As illustrated in FIG. 3, the support pins 28, 29 pass through the corresponding openings 38 formed in the front housing 2 and are fixed onto the bearing support frame 37 via washers 39' by means of bolts 39. In addition, the support pin 27 passes through an opening 42 formed in the front housing 2 and through an opening 43 formed in the bearing support frame 37. One end of a support arm 40 having a resilient plate shaped portion 40*a* is fixed onto the bearing support frame 37 by means of a bolt 41, and the support pin 27 is fixed onto the other end of the support arm 40 via a washer 44' by means of a bolt 44. Consequently, the pad 24 is urged onto the hollow cylindrical portion 8*a* of the rotary shaft 8 due to the resilient force of the support arm 40. On the other hand, as illustrated in FIGS. 1, 3 and 4, a threaded hole 45 is formed in the front having 2, and the tip of a bolt 47, passing through an opening 46 formed in the bearing support frame 37, is screwed into the threshold hole 45. A washer 48 is inserted into the bolt 47, and a compression spring 49 is inserted between the washer 48 and the bearing support frame 37. The bolt 47 serves to prevent the bearing support frame 37 from rotating and axially moving relative to the front housing 2 and also serves to electrically connect the front housing 2 to the bearing support frame 37 via the compression spring 49.

Figure 6:
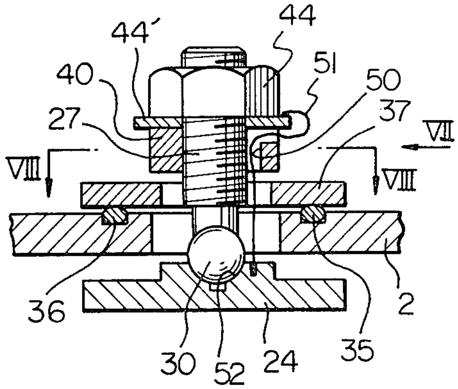
FIG. 6 is an enlarged cross-sectional side view of the portion indicated by the arrow B in FIG. 1.
Figure 7:
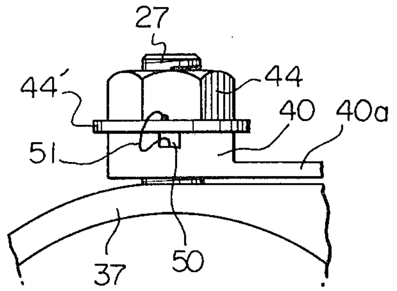
FIG. 7 is a side view taken along the arrow VII in FIG. 6.
Figure 8:
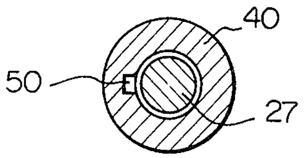
FIG. 8 is a cross-sectional view taken along the line VIII—VIII in FIG. 6.

Referring to FIGS. 6 through 8, an L-shaped groove 50 is formed in the support arm 40. This L-shaped groove 50 extends along the outer wall of the support pin 27 in the axial direction of the support pin 27 and then extends along the lower wall of the washer 44', and a lead 51 passes through the L-shaped groove 50. The lower end of the lead 51 is welded to the rear surface of the pad 24, and the upper end of the lead 52 is welded to the washer 44'. Consequently, the pad 24 is electrically connected to the bearing support frame 37 via the head 51, the washer 44' and the support arm 40. As mentioned above, the bearing support frame 37 is electrically connected to the front housing 2 via the compression spring 49 and the bolt 47 and, therefore, the pad 24 is electrically connected to the front housing 2. In addition, in the same manner as described above, the remaining pads 25 and 26 are also electrically connected to the corresponding washer 39' via leads (not shown). Consequently, the pads 25 and 26 are also electrically connected to the front housing 2 via the leads.

When the rotary shaft 8 is rotating at a high speed, since a high pressure is produced in the clearance between the outer wall of the rotary shaft 8 and the pads 24, 25, 26, the pads 24, 25 and 26 are in firm contact with the spherical tips 30, 31 and 32 of the support pins 27, 28 and 29, respectively. Consequently, at this time, the pads 24, 25 and 26 are electrically connected, on one hand, to the front housing 2 via the support pins 27, 28 and 29 and, on the other hand, to the front housing 2 via the corresponding lead 51, respectively. However, in the case wherein the rotating speed of the rotary shaft 8 becomes low, the pressure, created in the clearance between the outer wall of the rotary shaft 8 and the pads 24, 25, 26, becomes small. As a result of this, since it is difficult to maintain a stable air layer between the outer wall of the rotary shaft 8 and the pads 24, 25, 26, the pads 24, 25, 26 vibrate and, as a result, there is possibility the pads 24, 25 and 26 are temperarily forced away from the spherical tips 30, 31 and 32 of the support pins 27, 28 and 29, respectively. In FIG. 6, when the pad 24 becomes disconnected from the spherical tip 30, if the lead 51 is not provided, the pad 24 is electrically disconnected from the front housing 2. Consequently, at this time, a high potential deference is caused between the pad 24 and the spherical tip 30 and, as a result, problems occur in that an electric discharge will be caused between the pad 24 and the spherical tip 30, and that the electric erosion of the surface of the spherical recess 52, formed on the rear face of the pad 24, will be caused by the electric discharge. However, in the rotary type spray painting device according to the present invention, even if the pad 24 leaves from the spherical tip 30 of the support pin 27, since the pad 24 is electrically connected to the support arm 40 via the lead 51, a potential difference is not caused between the pad 24 and the spherical tip 30. Therefore, there is no danger that an electric discharge is caused between the pad 24 and the spherical tip 30, and there is also no danger that an electric erosion of the surface of the spherical recess 52 will be caused. As mentioned above, the bearing support frame 37 is mounted on the front housing 2 via the O rings 35, 36. These O rings 35, 36 serves to damp the vibration of the rotary shaft 8.

Figure 9:
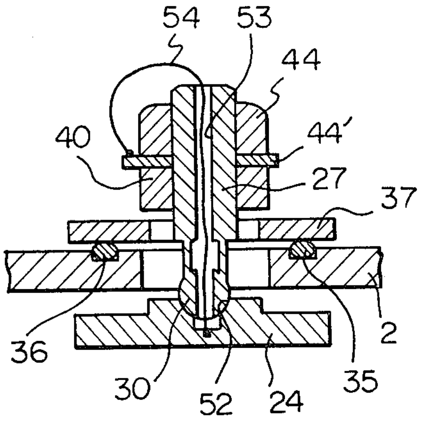
FIG. 9 is an enlarged cross-sectional side view of another embodiment according to the present invention.

FIG. 9 illustrates another embodiment. In this embodiment, a through-hole 53, extending in the axial direction of the support pin 27, is formed in the support pin 27, and a lead 54 passes through the through-hole 53. The lower end of the lead 54 is welded to the pad 24 in the spherical recess 52, and the upper end of the lead 54 is welded to the washer 44'.

Figure 10:
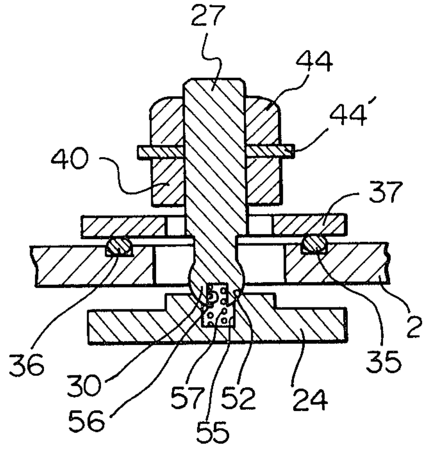
FIG. 10 is an enlarged cross-sectional side view of a further embodiment according to the present invention.

FIG. 10 illustrates a further embodiment. In this embodiment, a depression 55 is formed in the spherical recess 52 of the pad 24. In addition, another depression 56 is formed on the lower end of the spherical tip 30 of the support pin 27, and a compression spring 57 is inserted between the bottom of the depression 55 and the top of the depression 56. Consequently, in this embodiment, even if the pad 24 is forced away from the spherical tip 30 of the support pin 27, the pad 24 is still electrically connected to the support pin 27 via the compression spring 57.

Figure 5:
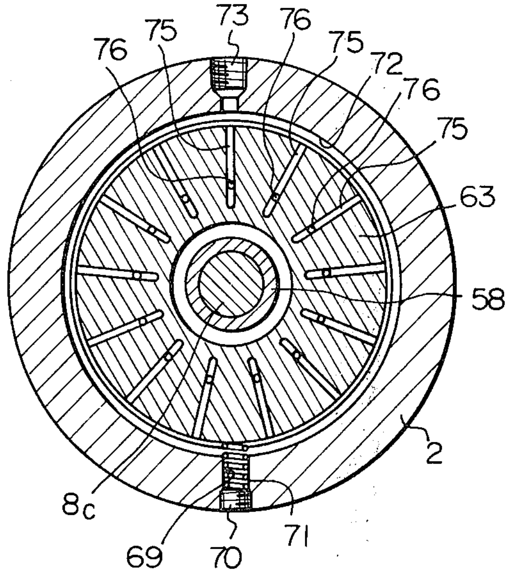
FIG. 5 is a cross-sectional view taken along the line V—V in FIG. 1.

Turning to FIG. 1, a pair of disc shaped runners 58, 59 is inserted into the shaft portion 8c of the rotary shaft 8 and fixed onto the shaft portion 8c via a spacer 60 and a turbine wheel 61 by means of a nut 62. A stationary annular plate 63 is arranged between the runners 58 and 59, and the runners 58, 59 and the annular plate 63 construct a non-contact type thrust air bearing. As illustrated in FIG. 1, each of the runners 58, 59 is spaced from the annular plate 63 by a slight distance. The annular plate 63 has an outer circumferential flange 63a, and a pair of O rings 64 and 65 is inserted between the front housing 2 and the outer wall of the outer circumferential flange 63a. In addition, an O ring 67 is inserted between the front housing 2 and the side wall of the outer circumferential flange 63a, and an O ring 68 is inserted between a nozzle holder 66 and the side wall of the outer circumferential flange 63a. A threaded hole 69, extending outwardly from the outer circumferential flange 63a, and a screw 70 is screwed into the threaded hole 69. A compression spring 71 is inserted between the screw 70 and the annular plate 63, and the annular plate 63 is electrically connected to the front housing 2 via the compression spring 71. As illustrated in FIGS. 1 and 5, an annular groove 72, extending along the outer circumferential wall of the outer circumferential flange 63a, is formed on the inner wall of the front housing 2 and connected to an air feed pump 74 via a compressed air supply hole 73 which is formed in the front housing 2. A plurality of air passages 75, each extending radially inwardly from the annular groove 72, is formed in the annular plate 63. In addition, a plurality of air outflow bores 76, each extending towards the runner 58 form the inner end portion of the corresponding air passage 75, is formed in the annular plate 63, and a plurality of air outflow bores 77, each extending towards the runner 59 from the inner end portion of the corresponding air passage 75, is formed in the annular plate 63.

As illustrated in FIG. 1, a turbine nozzle holder 66 is fixed onto the front housing 2 at a position adjacent to the annular plate 63, and an annular air supply chamber 78 is formed between the turbine nozzle holder 66 and the front housing 2. The air supply chamber 78 is connected to a compressor 80 via a compressed air supply hole 79. The air supply chamber 78 comprises a compressed air injecting nozzle 81 having a plurality of guide vanes (not shown), and turbine blades 82 of the turbine wheel 61 are arranged to face the compressed air injecting nozzle 81. A housing interior chamber 83, in which the turbine wheel 61 is arranged, is connected to the atmosphere via a discharge hole 84 which is formed in the rear housing 3. The compressed air fed into the air supply chamber 78 from the compressor 80 is injected into the housing interior chamber 83 via the compressed air injecting nozzle 81. At this time, the compressed air injected from the injecting nozzle 81 provides the rotational force for the turbine wheel 61 and, thus, the rotary shaft 8 is rotated at a high speed. Then, the compressed air injected from the injecting nozzle 81 is discharged to the atmosphere via the discharge hole 84.

A through-hole 86 is formed on an end wall 85 of the rear housing 3, which defines the housing interior chamber 83, and an electrode holder 87 extending through the through hole 86 is fixed onto the end wall 85 by means of bolts 87'. A cylindrical hole 88 is formed coaxially with the rotation axis of the rotary shaft 8 in the electrode holder 87, and a cylindrical electrode 89, made of wear resisting materials such as carbon, is inserted into the cylindrical hole 88 so as to be movable therein. In addition, a compression spring 90 is inserted between the electrode 89 and the electrode holder 87 so that the tip face 91 of the electrode 89 is urged onto the end face of the shaft portion 8*c* of the rotary shaft 8 due to the spring force of the compression spring 90. An external terminal 92 is fixed onto the outer wall of the rear housing 3 by means of bolts 93 and connected to a high voltage generator 94 used for generating a negative high voltage ranging from −60 kV to −90 kV. Consequently, the negative high voltage is applied to both the front housing 2 and the rear housing 3, and it is also applied to the spray head 9 via the electrode 89 and the rotary shaft 8.

In operation, paint is injected from the nozzle 21 of the paint injector 18 onto the circumferential inner wall of the outer cylindrical portion 14 of the spray head supporting member 12. Then, the paint, injected onto the circumferential inner wall of the outer cylindrical portion 14, flows out onto the inner wall 15 of the spray head body 13 via the paint outflow bores 16 due to the centrifugal force caused by the rotation of the spray head 9. After this, the paint spreads on the inner wall 15 of the spray head body 13 and flows on the inner wall 15 in the form of a thin film. Then, the paint reaches the tip 13*a* of the spray head body 13. As mentioned previously, a negative high voltage is applied to the spray head 9. Consequently, when the paint is sprayed from the tip 13*a* of the spray head body 13 in the form of fine particles, the particles of the sprayed paint the charged with electrons. Since the surface to be painted is normally grounded, the paint particles charged with electrons are attracted towards the surface to be painted due to electrical force and, thus, the surface to be painted is painted.

As mentioned previously, the rotary shaft 8 is supported by a pair of tilting pad radial air bearings 22, 23 and a single thrust air bearing which is constructed by the runners 58, 59 and the stationary annular plate 63. In the tilting pad radial air bearings 22, 23, when the rotary shaft 8 is rotated, ambient air is sucked into the extremely small clearances formed between the hollow cylindrical portion 8*a* and the pads 24, 25, 26. Then, the air thus sucked is compressed between the hollow cylindrical portion 8*a* and the pads 24, 25, 26 due to a so-called wedge effect of air, and therefore, the pressure of the air between the hollow cylindrical portion 8*a* and the pads 24, 25, 26 is increased. As a result of this, the force radially supporting the rotary shaft 8 is generated between the hollow cylindrical portion 8*a* and the pads 24, 25, 26. On the other hand, in the above-mentioned thrust air bearing, compressed air is fed into the air passages 75 from the air feed pumps 74 via the annular groove 72. Then, the compressed air is injected from the air outflow bores 76 into the clearance between the annular plate 63 and the runner 58, and also, injected from the air outflow bores 77 into the clearance between the annular plate 63 and the runner 59. As a result of this, the pressure, which is necessary to maintain the above-mentioned clearances formed on each side of the annular plate 63, is generated between the annular plate 63 and the runners 58, 59. Consequently, the rotary shaft 8 is supported by the thrust air bearing and a pair of the radial air bearings under a non-contacting state via a thin air layer. As is known to those skilled in the art, the coefficient of viscosity of air is about one thousandth of that of the viscosity of lubricating oil. Consequently, the frictional loss in the air bearing, which uses air as a lubricant, is extremely small. Therefore, since the amount of heat caused by the occurrence of the frictional loss is extremely small, it is possible to increase the rotating speed of the rotary shaft 8 to a great extent. In the embodiment illustrated in FIG. 1, it is possible to rotate the rotary shaft 8 at a high speed of about 80,000 r.p.m.

Figure 11:
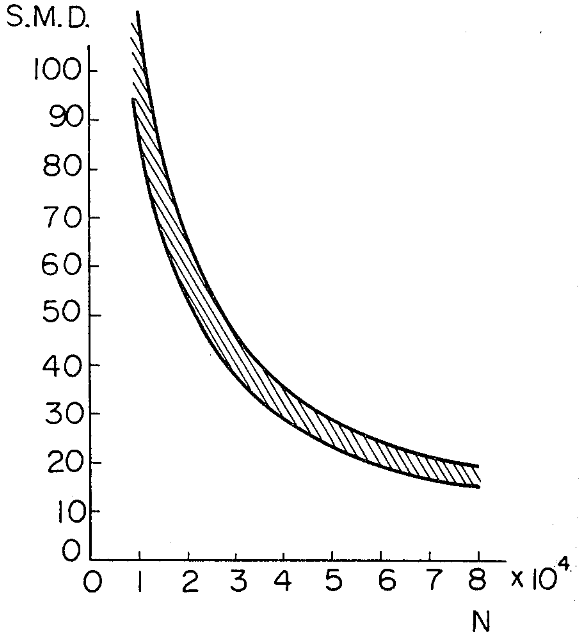
FIG. 11 is a graph showing the relationship between the size of paint particles and the rotating speed of the spray head.

FIG. 11 illustrates the relationship between the size of the particles of sprayed paint and the rotating speed of the spary head in the case wherein the spray head 9 (FIG. 1) having a diameter of 75 mm is used. In FIG. 11, the ordinate S.M.D. indicates the mean diameter ($\mu$m) of paint particles, which is indicated in the form of a Sauter mean diameter, and the abscissa N indicates the number of revolutions per minute (r.p.m.) of the spray head 9. As mentioned previously, in a conventional rotary type electrostatic spray painting device, the maximum number of revolutions per minute N of the spray head is about 20,000 r.p.m. Consequently, from FIG. 11, it will be understood that, if the spray head having a diameter of 75 mm is used in a conventional rotary type electrostatic spray painting device, the minimum mean diameter S.M.D. of paint particles is in the range of 55 $\mu$m to 65 $\mu$m. Contrary to this, in the present invention, the maximum number of revolutions per minute N is about 80,000 r.p.m. Consequently, from FIG. 11, it will be understood that the paint can be divided into fine particles to such a degree that the mean diameter S.M.D. of paint particles is in the range of 15 $\mu$m to 20 $\mu$m. Therefore, it will be understood that, in a rotary type electrostatic spray painting device according to the present invention, the size of paint particles can be greatly reduced, as compared with that of paint particles in a conventional rotary type spray painting device. In addition, as mentioned previously, the same negative high voltage is applied to the housings 2, 3 and the rotary shaft 8. Consequently, there is no danger that an electric discharge will occur between the housings 2, 3 and the rotary shaft 8. In addition, even if the rotating speed of the rotary shaft 8 becomes low, a potential difference is not caused between the rotary shaft 8 and the pads 24, 25, 26 of the tilting pad raidal air bearings 22, 23 and, as a result, there is no danger that an electric discharge is caused between them.

According to the present invention, since the spray head can be rotated at a high speed of about 80,000 r.p.m., the size of the particles of sprayed paint can be reduced to a great extent. As a result of this, the size of paint particles becomes smaller than that of paint particles obtained by using a conventional air injection type electrostatic spray painting device. Consequently, in the present invention, it is possible to obtain an extremely beautiful finished surface and, therefore, a rotary type electrostatic spray painting device can be used for carrying out a finish painting step in the paint process, for example, for bodies of motor cars. In addition, in the present invention, since paint particles are created by rotating the spray head at a high speed, but are not created by air injection, the amount of the paint used to effectively paint the surface to be painted is about 90 percent of the amount of the paint sprayed from a rotary type electrostatic spray painting device. Consequently, since a large part of the sprayed paint is not dispersed within the factory, it is possible to prevent the problem of air pollution from arising. In addition, the amount of paint used can be reduced.

While the invention has been described by reference to specific embodiments chosen for purposes of illustration, it should be apparent that numerous modifications could be made thereto by those skilled in the art without departing from the basic concept and scope of the invention.

We claim:

1. A rotary type electrostatic spray painting device comprising:

a metallic housing;

a metallic rotary shaft rotatably arranged in said housing and having a front end and a rear end;

a cup shaped metallic spray head fixed onto the front end of said rotary shaft and having a cup shaped inner wall;

feeding means for feeding a paint onto said cup shaped inner wall;

drive means cooperating with said rotary shaft for rotating said rotary shaft;

a pair of radial air bearings arranged in said housing and cooperating with said rotary shaft for radially supporting said rotary shaft under a non-contacting state, each of said radial air bearing comprising a bearing frame connected to said housing, a plurality of pads, each having an inner face which extends along a circumferential outer wall of said rotary shaft and spaced from the circumferential outer wall of said rotary shaft by a slight distance, and a plurality of support pins, each being connected to said bearing frame and pivotally supporting said corresponding pad;

electrically connecting means always electrically connecting said pads to said housing;

non-contact type thrust bearing means arranged in said housing and cooperating with said rotary shaft for axially supporting said rotary shaft under a non-contacting state;

a generator generating a negative high voltage and having an output connected to said housing, and;

electrode means arranged in said housing and electrically connecting said output to said spray head.

2. A rotary type electrostatic spray painting device as claimed in claim 1, wherein said electrically connecting means comprises a plurality of leads, each having a first end and a second end which is connected to said corresponding pad, said second end being connected to said bearing frame for electrically connecting said corresponding pad to said bearing frame.

3. A rotary type electrostatic spray painting device as claimed in claim 2, wherein said bearing frame has a plurality of L-shaped grooves, each being formed therein and extending along an outer wall of said corresponding support pin, each of said leads passing through said corresponding groove.

4. A rotary type electrostatic spray painting device as claimed in claim 2, wherein each of said support pins has an axially extending hole formed therein, each of said leads passing through said corresponding hole.

5. A rotary type electrostatic spray painting device as claimed in claim 1, said electrically connecting means comprises a plurality of compression springs, each being arranged between said corresponding pad and said corresponding support pin for electrically connecting said corresponding pad and said corresponding support pin.

6. A rotary type electrostatic spray painting device as claimed in claim 5, wherein each of said pads has an outer wall having a spherical recess formed thereon, each of said support pins having a spherical tip which is in engagement with the spherical recess of said corresponding pad, each of said compression springs being arranged between said corresponding spherical tip and said corresponding spherical recess.

7. A rotary type electrostatic spray painting device as claimed in claim 6, wherein each of said spherical tips has a depression, each of said spherical recesses having a depression arranged to face the depression of said corresponding tip, each of said compression springs being arranged in the depression of said corresponding spherical tip and the depression of said corresponding spherical recess.

8. A rotary type electrostatic spray painting device as claimed in claim 1, wherein each of said bearing frames is mounted on said housing via O rings and has a connecting device arranged between said corresponding bearing frame and said housing for electrically connecting said corresponding bearing frame to said front housing.

9. A rotary type electrostatic spray painting device as claimed in claim 8, wherein said connecting device comprises a bolt fixed onto said housing and projecting outwardly from said bearing frame, and a compression spring arranged between said bolt and said bearing frame.

10. A rotary type electrostatic spray painting device as claimed in claim 1, wherein each of said radial air bearings further comprises a resilient arm through which one of said support pins is connected to said bearing frame for biasing said corresponding pad to the circumferential outer wall of said rotary shaft.

11. A rotary type electrostatic spray painting device as claimed in claim 1, wherein said non-contact type thrust bearing means comprises a thrust air bearing.

12. A rotary type electrostatic spray painting device as claimed in claim 11, wherein said non-contact type thrust bearing means further comprises an feed pump for producing compressed air, said thrust air bearing comprising a stationary annular plate having opposed side walls, and a pair of runners fixed onto said rotary shaft and arranged on each side of said annular plate, each of said runners being spaced from the corresponding side wall of said annular plate, a plurality of air outflow bores connected to said air feed pump being formed on the opposed side walls of said annular plate.

13. A rotary type electrostatic spray painting device as claimed in claim 12, wherein said annular plate forms therein a plurality of radially extending air passages, each connecting said corresponding air outflow bore to said air feed pump.

14. A rotary type electrostatic spray painting device as claimed in claim 12, wherein said annular plate is mounted on said housing via O rings and has a connecting device arranged between said annular plate and said housing for electrically connecting said annular plate to said housing.

15. A rotary type electrostatic spray painting device as claimed in claim 14, wherein said connecting device comprises a compression spring.

16. A rotary type electrostatic spray painting device as claimed in claim 1, wherein said electrode means comprises an electrode which is arranged to continuously contact with the rear end of said rotary shaft.

17. A rotary type electrostatic spray painting device as claimed in claim 16, wherein said electrode is made of carbons.

18. A rotary type electrostatic spray painting device as claimed in claim 16, wherein the rear end of said rotary shaft has a flat end face extending perpendicular to the rotation axis of said rotary shaft, said electrode being arranged coaxially with the rotation axis of said rotary shaft and having a flat end face which is in contact with the flat end face of the rear end of said rotary shfat.

19. A rotary type electrostatic spray painting device as claimed in claim 16, wherein said electrode means further comprises an electrode holder fixed onto said housing and having therein a cylindrical hole, into which said electrode is slidably inserted, and a compression spring arranged in the cylindrical hole of said electrode holder between said electrode holder and said electrode.

20. A rotary type electrostatic spray painting device as claimed in claim 1, wherein said drive means comprises a compressor, an air injection nozzle arranged in said housing and connected to said compressor, and a turbine wheel fixed onto said rotary shaft and having a turbine blade which is arranged to face said air injection nozzle.

21. A rotary type electrostatic spray painting device as claimed in claim 1, wherein said cup shaed spray head comprises a cylindrical inner wall arranged coaxially with the rotation axis of said rotary shaft and defining therein an annular space, a plurality of paint outflow bores being formed in the cylindrical inner wall of said spray head and smoothly connected to the cup shaped inner wall of said spray head, said feed means having a paint injection nozzle which is arranged in said annular space.

* * * * *